United States Patent [19]

Stein

[11] 4,412,741
[45] Nov. 1, 1983

[54] METHOD FOR THE AUTOMATIC OR SEMIAUTOMATIC DISTANCE MEASUREMENT AND FOCUSING OF THE IMAGE OF AN OBJECT ONTO A FOCAL PLANE

[75] Inventor: Karl-Ulrich Stein, Munich, Fed. Rep. of Germany

[73] Assignee: Siemens Aktiengesellschaft, Berlin & Munich, Fed. Rep. of Germany

[21] Appl. No.: 295,256

[22] Filed: Aug. 24, 1981

Related U.S. Application Data

[63] Continuation-in-part of Ser. No. 69,788, Aug. 27, 1979, Pat. No. 4,320,302.

[30] Foreign Application Priority Data

Sep. 5, 1978 [DE] Fed. Rep. of Germany ....... 2838647

[51] Int. Cl.³ .................. H01J 40/14; G03B 7/08; G01C 3/00; G01C 5/00
[52] U.S. Cl. .................................. 356/1; 250/201; 250/204; 250/578; 354/25
[58] Field of Search .................. 356/1, 4; 354/25 R; 250/201, 204, 211 J, 578; 357/32

[56] References Cited

U.S. PATENT DOCUMENTS

| 3,717,770 | 2/1973 | Dyck et al. | 250/211 J |
| 4,002,899 | 1/1977 | Stauffer | 250/204 |
| 4,004,852 | 1/1977 | Pentecost | 356/4 |
| 4,171,155 | 10/1979 | Jyojiki et al. | 354/25 |
| 4,200,788 | 4/1980 | Agulnek | 250/578 |

FOREIGN PATENT DOCUMENTS

| 2811817 | 9/1978 | Fed. Rep. of Germany | 250/204 |
| 1273799 | 5/1972 | United Kingdom. | |
| 1389847 | 4/1975 | United Kingdom. | |
| 1447832 | 9/1976 | United Kingdom. | |
| 1521269 | 8/1978 | United Kingdom. | |

Primary Examiner—S. C. Buczinski
Attorney, Agent, or Firm—Hill, Van Santen, Steadman & Simpson

[57] ABSTRACT

In the exemplary embodiments, two line-shaped images of a scene are imaged onto two line sensors. The output signals of these line sensors are stored in successive stages of respective shift registers, whereby the distance measurement ensues by means of sequential examination of the correlation of the image element signals as stored by the shift registers. For the correlation examination, a predetermined set of stages of each shift register are read out in parallel for comparison. The image element signals are then alternately shifted in the respective shift registers followed by further parallel readout and comparison steps to locate the segments of the two line sensors having a maximum correlation.

14 Claims, 12 Drawing Figures

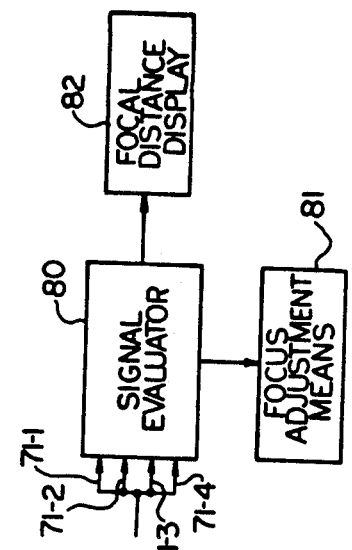
FIG. 8
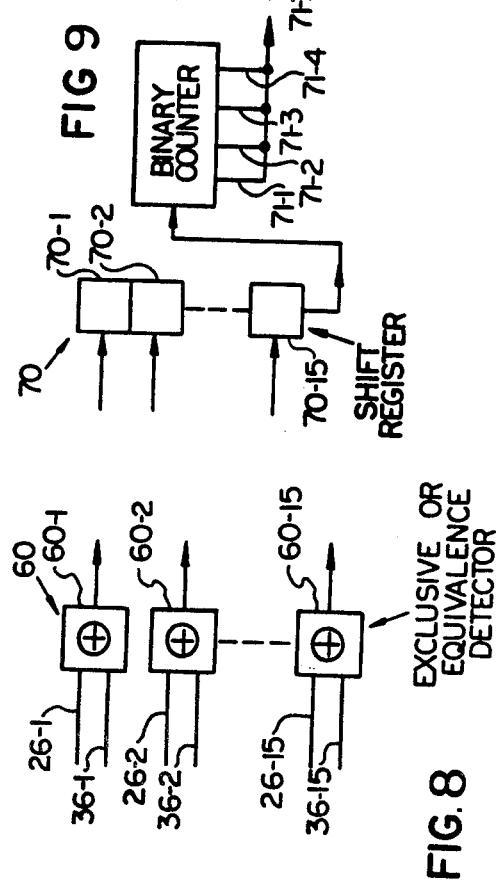
FIG 9
FIG 10
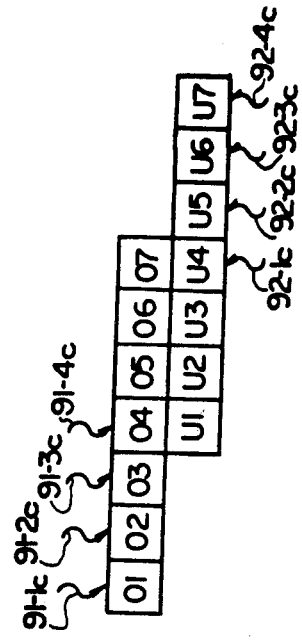
FIG. 12
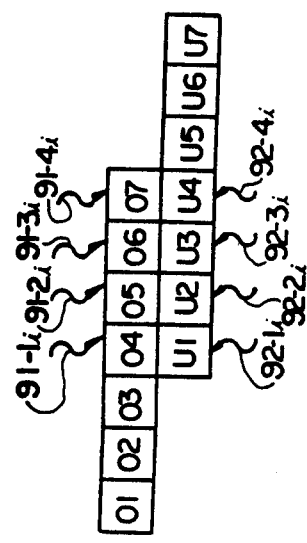
FIG. 11

4,412,741

METHOD FOR THE AUTOMATIC OR SEMIAUTOMATIC DISTANCE MEASUREMENT AND FOCUSING OF THE IMAGE OF AN OBJECT ONTO A FOCAL PLANE

CROSS REFERENCE TO RELATED APPLICATIONS

The present application is a continuation-in-part application based on my copending application Ser. No. 069,788 filed Aug. 27, 1979 (now U.S. Pat. No. 4,320,302). Reference is also made to my copending applications Ser. Nos. 020,812 and 020,813 both filed Mar. 15, 1979 (now U.S. Pat. Nos. 4,304,474 and 4,290,693). The disclosures of applications Ser. No. 020,812 and Ser. No. 020,813 are incorporated herein by reference as illustrating exemplary details and modifications applicable to the disclosure of Ser. No. 069,788, this later disclosure being physically present herein.

BACKGROUND OF THE INVENTION

The invention relates to a method for the automatic or semiautomatic distance measurement and focusing of the image of an object onto a focal plane, whereby the image is obtained via a lens which is movable in the direction of its optical axis to effect a focus.

An arrangement for the automatic focusing with the assistance of photodiodes and an electronic circuit is known from the periodical *Electronics* (Nov. 10, 1977, pages 40 ff). The known arrangement functions according to the method of angular measuring, whereby two separate images of the object are projected onto two surface-like arrangements of photodiodes with the assistance of mirrors. With the assistance of a small motor, the lens and one of the mirrors is moved until the mean brightness of photodiodes corresponding to one another coincides. This method functions with an analog processing circuit such as can be realized in the technology of bipolar integrated circuits.

A difficulty of the known method is that, in principle, it requires large silicon surfaces for the integration. This can only be realized with relatively high outlay since an expensive bipolar analog technology is required.

SUMMARY OF THE INVENTION

It is therefore the object of the invention to specify a method which renders possible an automatic distance measuring without the occurrence of the said difficulties.

This object is inventively achieved in that two line-shaped image sections are imaged onto two line sensors; in that the output signals of the line sensors are digitally further processed; in that the distance measurement ensues by means of sequential examination of the correlation of the digitalized measuring results of the line sensors; in that the parts of the line sensors which respectively lie opposite one another and overlap one another are employed for the correlation examination; in that the correlation examination is carried out in an equivalence detector; in that the results of the correlation examination are summed up in an adder and are supplied to a signal evaluator which controls the focus adjustment or, respectively, displays a coded signal.

Expedient embodiments of the invention are specified in the subclaims.

An advantage of the invention is that the output signals of the sensor elements can be digitally further processed. Thus, the further signal processing can be realized in digital technology on the same chip.

A particular advantage of a distance measurement with digitalized image signals is that it can be completely realized on one chip in a MOS digital technology—as is employed for memories or charge coupled devices—without changing the process and upon employment of known circuit structures. Thereby, the extent of integration remains within a surveyable frame, thus, for example, for a comparison width of 32 image points and a deflection of 32 image points, i.e. for 64 measuring positions, approximately 3000 transistor functions are required (2,000 of them for sensors, shift register and preparation of the measuring value, 1,000 for the signal evaluation).

An exposure measurement or, respectively, an automatic exposure control can be realized on the same chip with relatively little additional outlay. To that end, the signal of comparison sensors is employed, which exists in the simplest case as a binary value, the measurement duration. If one measures this duration with a counter, then a so-called automatic exposure time or diaphragm mechanism can be simply implemented. Only minimum demands are to be thereby made of the frequency standard employed for the time measurement since the same standard is also employed with the same relative error for the output of the exposure time.

Further advantages of the invention are explained on the basis of exemplary embodiments illustrated on the accompanying sheets of drawings; and other objects, features and advantages will be apparent from this detailed disclosure and from the appended claims.

BRIEF DESCRIPTION OF THE DRAWINGS

FIG. 8 is a diagrammatic illustration of an exemplary equivalence detector for the case where the shift registers according to FIG. 2 or FIG. 5 each have thirty-two photodiodes;

FIG. 9 is a diagrammatic illustration of an Adder for association with the equivalence detector of FIG. 8;

FIG. 10 is a diagrammatic illustration of a signal evaluator arrangement for association with the components of FIGS. 8 and 9;

FIG. 11 is a view similar to FIG. 1 but indicating the case where respective light intensities impinging on image elements 04–07 and U1–U4 match (corresponding to an "infinite" distance setting); and FIG. 12 is a view similar to FIG. 1 but indicating the case where respective light intensities impinging on image elements 01–04 and U4–U7 match (corresponding to a close-up distance setting).

DETAILED DESCRIPTION

Figure 1:
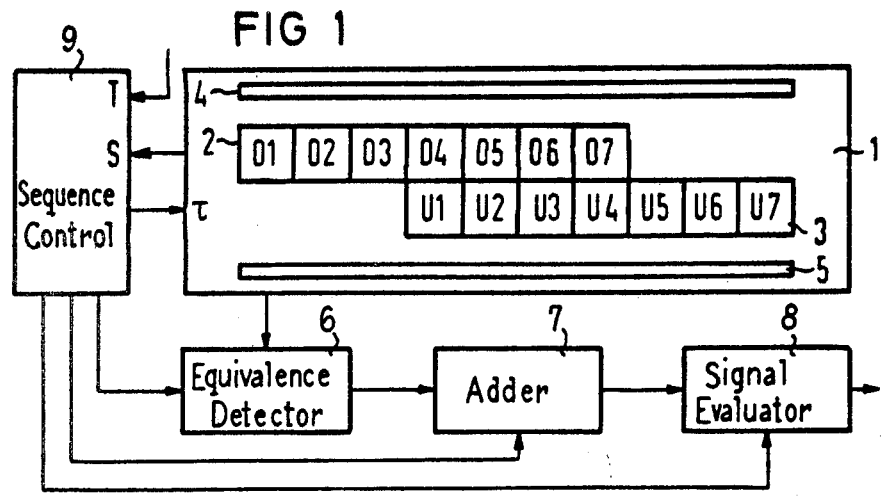
FIG. 1 shows a block diagram of an automatic range finder.

The block diagram of the automatic range finder according to the invention is illustrated in FIG. 1, whereby the measurement of the distance is carried out in conjunction with a modified split-image range finder as described under the heading "Summary of the Invention", herein.

The photosensor and shift register part 1 can be seen in the center of the block diagram. Two line sensors 2, 3 for the upper and lower pupil of the split-image principle are illustrated. Further, two comparison (reference) sensors 4, 5 are schematically illustrated in part 1.

The principle of the split-image range finder is based on a correlation examination between the line-shaped image sections covered by the upper line sensor 2 and the lower line sensor 3. To that end, simplified line sensors 2 and 3 with respectively seven image points (01 through 07 for the upper line sensor and U1 through U7 for the lower line sensor) are illustrated in the figure. In the example illustrated in FIG. 1, the four image elements 04 through 07 of the upper line sensor 2 and U1 through U4 of the lower line sensor 3 lie opposite one another, whereby, for example, a distance setting "infinite" is realized when the respective pairs of image elements or photodiode output quantities 04, U1; 05, U2; 06, U3; and 07, U4 all match. In contrast thereto, given a close-up distance setting "1 m", the line sensors are respectively deflected by three elements to the right, or respectively, to the left, so that the image elements 01 through 04 and U4 through U7 lie opposite one another and a simultaneous match of the respective pairs 01, U4; 02, U5; etc., is found.

In this example, the measurement itself ensues by means of a sequential examination of the correlation of the digitalized measuring results of the upper and lower line sensor. The parts of the line sensors 2 and 3 which respectively lie opposite one another and overlap are employed for the correlation examination. The seven positions (number of the image elements in the comparison zone or width: four; plus number of the image elements to be subject to shifting into the comparison zone: three) detectable in the example illustrated are examined in seven individual examinations in the equivalence detector 6. The equivalence detector 6 is equipped with gates for exclusive OR. It is particularly advantageous in this arrangement that after each individual step of the correlation examination, a new examination is prepared by means of a shift toward the right in the upper register 2, or, respectively, a shift toward the left in the lower register 3. The step-by-step shifting occurs in such a manner that, always alternately, the upper shift register 2 is shifted by one step toward the right, and following thereupon the lower shift register 3 is shifted by one step to the left. In the example illustrated, thus, 04 through 07 and U1 through U4 first lie opposite one another. Then, the upper shift register is shifted by one step toward the right, whereby 03 through 06 and U1 through U4 lie opposite one another. In the next step, there ensues the shift of the lower shift register by one step toward the left, so that 03 through 06 and U2 through U5 lie opposite one another. At the end of the respectively step-by-step shifting, thus, 01 through 04 and U4 through U7 lie opposite one another.

The results of the correlation examination (given complete coincidence, four parallelly matching pairs of logical ones or zeros occur, to produce four output logical ones in the simplified embodiment of FIG. 1) are added up in the adder 7 and are thus available for signal evaluation. Thereby, the adder 7 consists of a shift register and a counter with a parallel binary coded output, for example.

In the simplest case, the signal evaluator 8 consists of a circuit which displays in which position a high correlation result between sensors 2 and 3 occurs (for example, the total match sequence to the counter "1111" in the simplified embodiment illustrated). This position can be output as the range statement for the control of an adjustment (for example, as a pulse train for a stepping motor) and/or as a coded signal (e.g. binary 001) for a range display.

The said, simple measuring method can for example be employed when only simple image contents—as are offered for example by a black-white edge—are employed for the measurement. If a reliable measurement is also to be carried out given more complex image contents, then the signal evaluator 8 must exhibit a sum storage (e.g. for each a binary coded number) and a sum comparison together with a determination of each position of the correlation which produces the largest sum. The coding of the comparison result for the range output—as already explained above—is post-connected to these functions. The signal evaluator 8, for example, can be implemented by means of an appropriate microprocessor structure.

The measurement is initiated by supplying a pulse to input T of the sequence control 9 (e.g. upon actuation of the camera shutter). Further, a circuit is contained in the sequence control 9 which supplies the clock pulses to input $\tau$ of the sensor and shift register part 1 and processes the signals received at input S from the reference sensors 4, 5.

Figure 2:
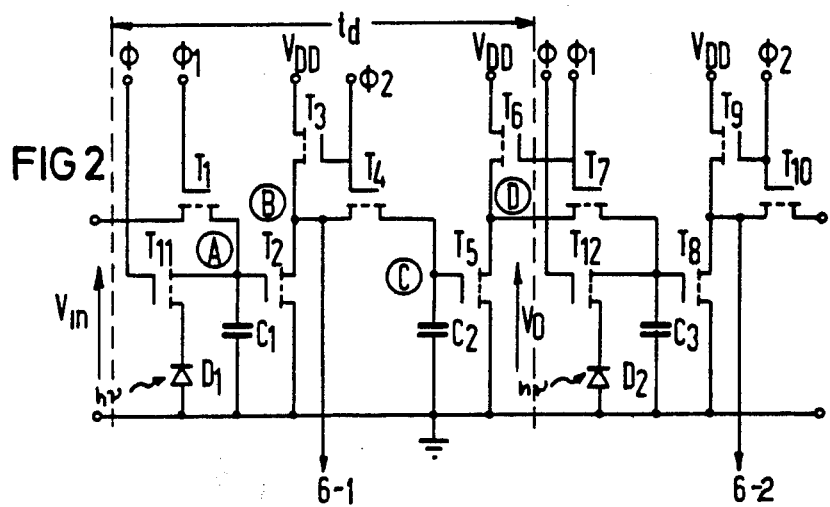
FIG. 2 shows a dynamic shift register with photosensors.

A dynamic shift register consisting of transistors $T_1$ through $T_{10}$ and the capacitances $C_1$ through $C_3$ is illustrated in FIG. 2 which is expanded by the detector diodes $D_1$ and $D_2$ with post-connected transfer transistors $T_{11}$, $T_{12}$ for the image signal acceptance.

Figure 7:
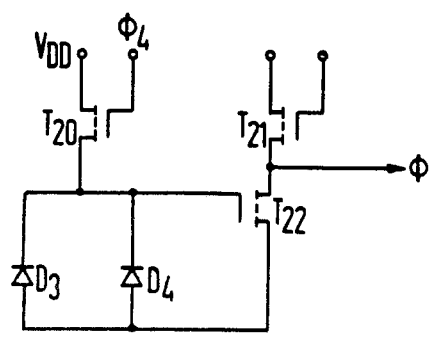
FIG. 7 shows a circuit diagram of two comparison sensors.

For initiating the line pickup the shift register is placed in an operating state in which the node A is applied to high potential (VDD) via the output of a preceding inverter (compare $T_6$, $T_7$, FIG. 2) and the transfer transistor $T_1$. For initiating the measurement, $\phi_1$, the clock pulse at the shift register transfer transistor $T_1$ is switched off. Depending on the exposure of the photodiode $D_1$, the node A is now more or less strongly discharged. The time span required for the discharge, i.e., the measurement duration, is determined with the assistance of the comparison sensors 4, 5 lying parallel to the line sensors. The circuit (see FIG. 7) generates a pulse edge which terminates the measuring duration as soon as the threshold value of the voltage for changing-over the inverter $T_{22}$, FIG. 7, is achieved on the average across all of the sensors $D_3$, $D_4$ of the comparison sensors component 4, 5. By so doing, the transfer transistors $T_{11}$, $T_{12}$ are switched off with the assistance of the clock pulse $\phi$. The analog signal of the sensor such as $D_1$ pending at this point in time at the node A is converted via the inverter curve of the transistors $T_2$, $T_3$ into a binary value (i.e. logical zero or logical one) which can be tapped at node B (see $V_B$, FIG. 2) for output via 6-1, FIG. 2, to the equivalence detector 6. In case the transmission curve of the inverter employed is not sufficient for this purpose, a tap is to be provided at the node D.

The exemplary embodiment illustrated in FIG. 2 with the two detector diodes $D_1$ and $D_2$ and the two transfer transistors $T_{11}$, $T_{12}$ relates to two image elements for components 2 and 3 and is to be increased in accord with the number of image elements required for each line sensor component 2, 3.

Figure 3:
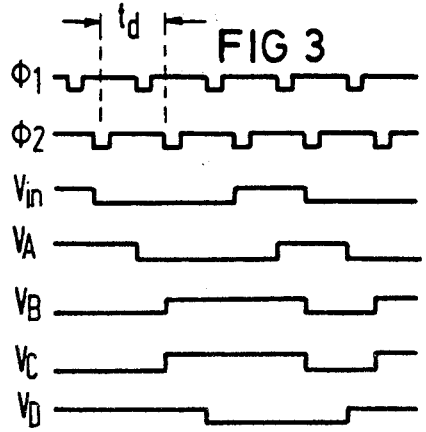
FIG. 3 shows a timing diagram which illustrates the operation of the shift register according to FIG. 2.

A timing diagram for the clock pulse sequence in the standard shift register operation of the exemplary embodiment according to FIG. 2 is illustrated in FIG. 3. Further, the time delay $t_d$ for one bit is illustrated in FIGS. 2 and 3.

Figure 4:
FIG. 4 shows a timing diagram which illustrates the clock pulse sequence for effecting a measurement cycle by the shift register according to FIG. 2.

A timing diagram of the clock pulse sequence during a measurement cycle, the formation of the binary values and the correlation and shift phase of the exemplary embodiment according to FIG. 2 is illustrated in FIG. 4. Thereby, the pulse $\phi_1$ sets the node A to the drain voltage $V_{DD}$. The pulse $\phi$, FIG. 4, represents the measurement duration.

Figure 5:
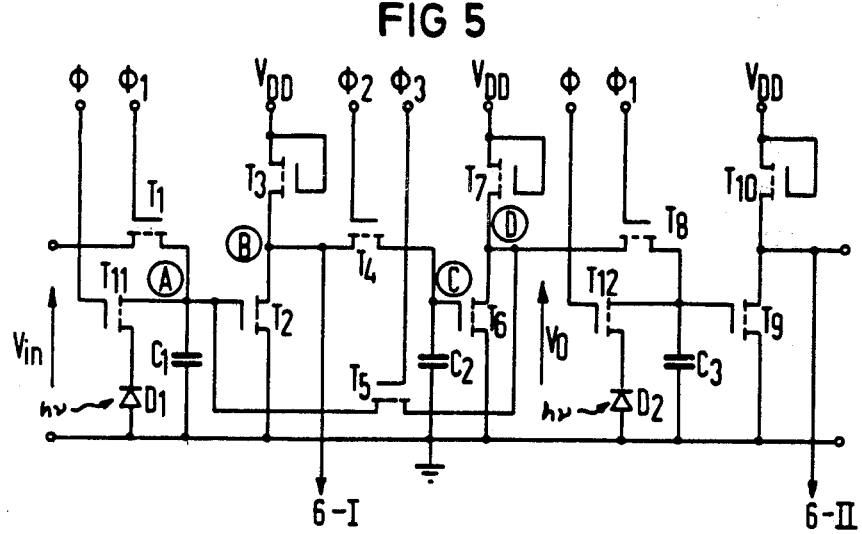
FIG. 5 shows a static shift register with photosensors.

A further exemplary embodiment is illustrated in FIG. 5 in which a static shift register that functions as a flip-flop amplifier is expanded by the detector diodes $D_1$ and $D_2$ and the transfer transistors $T_{11}$, $T_{12}$ for the image signal pickup. The manner of functioning is similar to that of the exemplary embodiment illustrated in FIG. 2 whereby, for initiating the line pickup, the shift register is placed in an operating state in which the node A is applied to high potential ($V_{DD}$). For initiating the measurement, $\phi_1$ is switched off and the node A is more or less strongly discharged depending on the exposure of the photodiode $D_1$. The formation of the binary value ensues by means of activation of the clock pulses $\phi_2$ and $\phi_3$ (switching-on of the flip-flop). This binary value is tapped at node B via line 6-I for output to the equivalence detector 6.

In this exemplary embodiment, too, the number of photodiodes and transfer transistors is determined by the number of image elements required.

Figure 6:
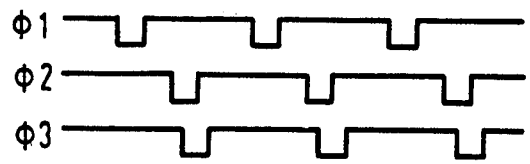
FIG. 6 shows a timing diagram which illustrates the operation of the shift register according to FIG. 5.

A timing diagram of the clock pulse sequence in the shift operation of the exemplary embodiment according to FIG. 5 is illustrated in FIG. 6. In measuring operation, the clock pulse sequence of the exemplary embodiment according to FIG. 5 is similar to the clock pulse sequence for the sample embodiment according to FIG. 2 (see FIG. 4).

FIG. 7 illustrates a circuit arrangement by which the pulse for defining the measuring duration $\phi$ is formed. The beginning of the measuring duration is effected by means of the reset clock pulse $\phi_4$ at the reset transistor $T_{20}$. The formation of the pulse for the measuring duration ensues from the discharge of the two comparison photosensors $D_3$, $D_4$ of components 4 and 5, evaluated in a static inverter $T_{21}$, $T_{22}$ of the same dimensions as in the shift registers.

The photodiodes $D_1$, $D_2$ illustrated in FIGS. 2 and 5 as well as the comparison photosensors $D_3$, $D_4$ according to FIG. 7 can be employed in devices present in the MOS process such as, for example, source and drain diffusions or source and drain terminal implantations or, respectively, as inversion surface barriers under transparent electrodes as in charge coupled devices (CCD).

In addition to the circuit arrangements illustrated in FIGS. 2 and 5, which represent the function for the simplest known dynamic, or, respectively static shift registers, these circuit arrangements can also be meaningfully realized in enhancement/depletion technologies and in improved dynamic techniques. The invention is particularly suited for use in photographic cameras and film apparatuses and also for the automatic distance measurement for separation and velocity measurements in traffic and in mensuration, control and regulating technology.

For an embodiment as discussed under the heading "Summary of the Invention" herein, sensors 2 and 3 may each comprise thirty-two photodiodes such as $D_1$, $D_2$, FIG. 2 or FIG. 5, each controlling charge on respective capacitors such as $C_1$, $C_3$, etc., which correspond to the respective storage cells 01, 02, etc., of register 2 and U1, U2, etc., of register 3.

The equivalence detector 6 may read the respective values at outputs 6-1, 6-2, etc., FIG. 2, or at 6-I, 6-II, etc., FIG. 5, during each examination cycle, and prior to each shift operation as represented in FIG. 3 or FIG. 6. In the simplest case the charge values 01 through 07 and U1 through U7 may represent logical zero or logical one values to the equivalence detector 6; and the equivalence detector may utilize four exclusive OR circuits to determine when the pairs of charge values at the four outputs such as 6-1 and 6-2 of the shift registers of components 2 and 3 all match simultaneously.

In a more elaborate equivalence detector such as indicated in FIG. 8, the number of "overlapping" shift register outputs in the comparison zone (such as 6-1 and 6-2, etc., FIG. 2) from the respective line sensors corresponding to 2 and 3, might equal fifteen where there are thirty-two photodiodes per line sensor, and FIG. 8 illustrates an equivalence detector 60 wherein fifteen shift register outputs from one line sensor (corresponding to 2, FIG. 1) are connected to respective inputs 26-1 through 26-15 of respective exclusive OR circuits 60-1 through 60-15, while fifteen shift register outputs from the other line sensor (corresponding to line sensor 3, FIG. 1) are connected with respective inputs 36-1 through 36-15 of the exclusive OR circuits 60-1 through 60-15.

The output of each exclusive OR circuit such as 60-1 through 60-15, FIG. 8, could provide a logical one for the case of a matching pair (0, 0; or 1, 1) and a logical zero for a non-match (0, 1; or 1, 0). Thus for the more elaborate example, the summer 7 would provide a maximum signal of decimal fifteen value for a complete match. The signals from the respective exclusive OR circuits, e.g. fifteen logical ones or zeros for the more elaborate case, could be supplied to respective stages such as 70-1 through 70-15 of a shift register 70, FIG. 9, and sequentially applied to the input of a binary counter such as 71, FIG. 9, with parallel output such as indicated at 71-1, 71-2, 71-3, 71-4, to signal evaluator 8. Thus a binary digital number of say four binary digit positions would be received by signal evaluator 8 for each examination cycle of equivalence detector 6. In the more elaborate example, seventeen examination cycles would provide evaluator 8 with seventeen binary numbers to be compared to select the maximum value signal evaluator is indicated at 80 in FIG. 10. Thus, as represented in FIGS. 9 and 10, the results of the correlation examination are summed up in an adder (70, 71, FIG. 9) and are supplied to a signal evaluator (80, FIG. 10) which controls the focus adjustment (via focus adjustment means 81, FIG. 10) or, respectively, displays a coded signal (at focal distance display 82, FIG. 10).

By way of example, the reference sensors 4, 5, FIG. 1, may be implemented as shown in FIG. 7; and each photodiode $D_3$ and $D_4$ may represent a linear series of such photodiodes as suggested by the physical extent and arrangement of components 4 and 5, component 4 receiving illumination from the linearly extended light image impinging on line sensor 2, and component 5 receiving a total illumination proportional to the average light intensity of the linearly extended light image impinging on line sensor 3.

For the sake of diagrammatic illustration, FIG. 11 illustrates the case where the linearly extended light images impinging on line sensors 2 and 3 provide matching light intensities (represented by photon arrow symbols 91-1i through 91-4i and 92-1i through 92-4i) impinging on image element 04 through 07 and U1 through U4. As previously stated a distance setting "infinite" is realized when the respective pairs of photodiode output quantities from image elements 04, U1; 05, U2; 06, U3; and 07, U4 all match. FIG. 12 illustrates the case where matching light intensities (represented by photon arrow symbols 91-1c through 91-4c and 92-1c through 92-4c) impinge on image elements 01 through 04 and U4 through U7. As previously stated a close-up distance setting is realized when a simultaneous match exists between the respective pairs 01, U4; 02, U5; etc.

It will be apparent that many modifications and variations may be effected without departing from the scope of the novel concepts and teachings of the present invention.

I claim as my invention:

1. In a method for automatic distance measurement including the steps of
    (a) examining two line shaped image sections so as to locate respective linear image segments thereof which have a maximum correlation as to respective corresponding light intensities along the lengths of the respective image segments,
    (b) conducting a correlation examination by comparing different image segments of the two line shaped image sections in a predetermined order as a sequence of comparison steps, such that the identification of the comparison step giving rise to a maximum correlation provides a measure of distance, and
    (c) utilizing the identification of the comparison step giving rise to the maximum correlation to provide an automatic distance indication,
the improvement wherein
    (d) the examining of the two line shaped image sections pursuant to step (a) above is effected by storing image element signals in successive stages of first and second shift registers in accordance with the light intensities of successive elemental regions of the respective line shaped image sections, and
    (e) the conducting of the correlation examination pursuant to step (b) above is effected by
        (e1) during each comparison step, reading out in parallel at one respective end of each shift register from a number of shift register stages corresponding to the number of elemental regions which represent the length of an image segment,
        (e2) comprising corresponding image element signals of the respective subsets of image element signals read out from the respective shift registers during the comparison step, so as to compare the corresponding segments of the respective line shaped image sections, and
        (e3) after each reading out of respective subsets of image element signals at the respective one ends of the respective shift registers, alternately shifting the image element signals of the first shift register toward its one end and again executing a comparison step, and alternately shifting the image element signals of the second shift register toward its one end and again executing a comparison step, so that subsets of image element signals corresponding to segments of the two image sections are respectively supplied for comparison with each other in a predetermined order and during a sequence of comparison steps defined by the alternate shifting of the image element signals in the first and second shift registers.

2. A method according to claim 1, with the examining of the two line shaped image sections comprising the steps of
    subjecting first and second lines of image sensing elements associated with the respective stages of the first and second shift registers to the light intensities of successive elemental regions of the respective line shaped image sections so as to generate image element signals, and
    transferring the respective image element signals to respective stages of the first and second shift registers in parallel.

3. A method according to claim 2, with the image element signals transferred to the respective shift register stages being obtained by integration of the outputs of the image sensing elements over a measuring duration.

4. A method according to claim 3 with the integration of the outputs of the image sensing elements being effected over a measuring duration which is a function of the average light intensity of the respective image sections.

5. A method according to claim 2, wherein the image sensing elements comprise detector diodes ($D_1$, $D_2$) with series connected transfer transistors ($T_{11}$, $T_{12}$), the transferring of the respective image element signals to the respective stages of the first and second shift registers being effected by actuating the transfer transistors for a measuring duration.

6. A method according to claim 2, wherein analog outputs of the image sensing elements are converted to binary digital form as a result of the operating characteristics of transistors associated with the respective stages of the first and second shift registers.

7. A method according to claim 6, with the correlation examination being effected by supplying subsets of image element signals in binary digital form from the respective one ends of the first and second shift registers to respective first and second inputs of exclusive OR gates such that the number of active outputs from such OR gates is a measure of the degree of correlation between the respective corresponding image element signals of the subsets of image element signals being compared.

8. In a method for automatic distance measurement and focusing of the image of an object onto a focal plane, said method including the steps of
    (a) examining two elongated image sections so as to locate respective image segments thereof which have a maximum correlation as to respective corresponding light intensities along the lengths of the respective image segments,
    (b) conducting a correlation examination by comparing different image segments of the two image sections in a predetermined order as a sequence of comparison steps, such that the identification of the comparison step giving rise to the maximum correlation provides a measure of the distance the object from the focal plane, and
    (c) utilizing the identification of the comparison step giving rise to the maximum correlation to provide an indication of focal distance and to focus the object onto the focal plane,
wherein the improvement comprises (d) the examining of the two line shaped image sections pursuant to step (a) above being effected by storing image element signals in successive stages of first and second shift registers in accordance with the light intensities of successive elemental regions of the respective image sections, and (e) the conducting of the correlation examination pursuant to step (b) above being effected by (e1) during each comparison step, reading out in parallel from a predetermined number of output-supplying shift register stages corresponding to the number of elemental regions which represent the length of an image segment, (e2) comparing corresponding image element signals of the respective subsets of image element signals read out from the respective shift registers during the comparison step, so as to compare the corresponding segments of the respective image sections, and (e3) after each readout out of respective subsets of image element signals at the respective output-supplying shift register stages of the respective shift registers, alternately shifting the image element signals of the first shift register toward its output-supplying shift register stages and again executing a comparison step, and alternately shifting the image element signals of the second shift register toward its output supplying shift register stages and again executing a comparison step, so that subsets of image element signals corresponding to each of the segments of the two image sections are respectively supplied for comparison with each other in a predetermined order and during a sequence of comparison steps, defined by the alternate shifting of the image element signals in the first and second shift registers.

9. A method according to claim 8, with the examining of the two elongated image sections comprising the steps of subjecting first and second lines of image sensing elements associated with the respective stages of the first and second shift registers to the light intensities of successive elemental regions of the respective elongated image sections so as to generate image element signals, and transferring the respective image element signals to respective stages of the first and second shift registers in parallel.

10. A method according to claim 9, wherein analog outputs of the image sensing elements are converted to binary digital form as a result of the operating characteristics of transistors associated with the respective stages of the first and second shift registers.

11. A method according to claim 10, with the correlation examination being effected by supplying subsets of image element signals in binary digital form from the respective one ends of the first and second shift registers to respective first and second inputs of exclusive OR gates such that the number of active outputs from such OR gates is a measure of the degree of correlation between the respective corresponding image element signals of the subsets of image element signals being compared.

12. A method according to claim 9, with the image element signals transferred to the respective shift register stages being obtained by integration of the outputs of the image sensing elements over a measuring duration.

13. A method according to claim 12, with the integration of the outputs of the image sensing elements being effected over a measuring duration which is a function of average light intensity of the respective image sections.

14. A method according to claim 9, wherein the image sensing elements comprise detector diodes ($D_1$, $D_2$) with series connected transfer transistors ($T_{11}$, $T_{12}$), the transferring of the respective image element signals to the respective stages of the first and second shift registers being effected by actuating the transfer transistors for a measuring duration.

* * * * *